(12) United States Patent
Lehenbauer et al.

(10) Patent No.: US 7,565,619 B2
(45) Date of Patent: Jul. 21, 2009

(54) SYSTEM AND METHOD FOR AUTOMATIC ITEM RELOCATING IN A USER INTERFACE LAYOUT

(75) Inventors: Daniel J. Lehenbauer, Redmond, WA (US); Jeffrey T. Chrisope, Kirkland, WA (US); Jessica Lynn Fosler, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 505 days.

(21) Appl. No.: 10/926,640

(22) Filed: Aug. 26, 2004

(65) Prior Publication Data

US 2006/0048052 A1    Mar. 2, 2006

(51) Int. Cl.
*G06F 3/048* (2006.01)
*G06F 17/00* (2006.01)

(52) U.S. Cl. ................. 715/788; 715/243; 715/244
(58) Field of Classification Search ............ 715/517, 715/518, 521, 788
See application file for complete search history.

(56) References Cited

U.S. PATENT DOCUMENTS

| | | | | |
|---|---|---|---|---|
| 5,600,776 | A * | 2/1997 | Johnson et al. | 715/733 |
| 5,915,113 | A * | 6/1999 | McDonald et al. | 717/109 |
| 6,111,573 | A * | 8/2000 | McComb et al. | 715/763 |
| 6,414,677 | B1 * | 7/2002 | Robertson et al. | 345/419 |
| 6,968,511 | B1 * | 11/2005 | Robertson et al. | 715/835 |
| 2003/0025737 | A1 * | 2/2003 | Breinberg | 345/801 |
| 2003/0164859 | A1 * | 9/2003 | Evans | 345/792 |
| 2004/0056894 | A1 * | 3/2004 | Zaika et al. | 345/762 |
| 2004/0225960 | A1 * | 11/2004 | Parikh et al. | 715/517 |
| 2004/0261012 | A1 * | 12/2004 | Balsiger | 715/508 |
| 2005/0102632 | A1 * | 5/2005 | Klinger et al. | 715/789 |
| 2005/0125742 | A1 * | 6/2005 | Grotjohn et al. | 715/799 |

OTHER PUBLICATIONS

Cascading Style Sheets, level2 CSS2 Specification W#C Recommentation May 12, 1998 Chapter 8 Printouts from archive.org dated Feb. 10, 2003.*
The Windows Forms Team May 2004 Word Document Printout pp. 1-20.*
KMA Insights IT Trends and Business Impact Top Ten Visual Studio 2005 Enhancements for Windows Forms Development (Part 1) vol. 4 No. 6 May 2004.*
Subhag Oak Soaked in Cider! New Layout Mechanism in Whidbey Posted May 18, 2004.*

* cited by examiner

*Primary Examiner*—Doug Hutton
(74) *Attorney, Agent, or Firm*—Woodcock Washburn LLP

(57) ABSTRACT

A layout including a plurality of items therein is instantiated on a display of a computing device. At least one of the items and the layout are changeable and may require relocation and/or resizing. Each item has a periphery and at least one of the items is defined to include a margin exterior to the periphery thereof. The margin is a defined distance from the periphery of the item within which another item cannot reside. In response to another item being moved so as to encroach upon the margin of an item at issue, the item at issue is to be relocated away from and in the opposite direction from the another item to clear such encroaching item from such encroached-upon margin and thereby relieve such encroachment.

5 Claims, 5 Drawing Sheets

SYSTEM AND METHOD FOR AUTOMATIC ITEM RELOCATING IN A USER INTERFACE LAYOUT

TECHNICAL FIELD

The present invention relates to a system and method for automatically relocating an item within a user interface layout when, for example, the layout is resized or another item within the layout is relocated or resized. More particularly, the present invention relates to relocating such item within a layout in a simpler and more easily definable manner.

BACKGROUND OF THE INVENTION

In many computer-type applications, a plurality of items that are to be displayed to a user in a defined area on a display or the like are organized according to a layout. As may be appreciated, the defined area maybe a 'window' within the display devoted to some defined functional commonality. For example, if the defined area represents options for settings in connection with a computer application, the items may relate to displaying and setting such options. Likewise, if the defined area represents a shut-down interface in connection with a computer application, the items may relate to available choices for proceeding with a shut-down of such application. Thus, each item in such defined area likely has some relationship to the functional commonality, and such item may for example be a text entry box, a text display box, a selection button, a check mark line, a tab, a drop-down line, or the like.

Note that in at least some instances, each item is a 'control' and the layout is itself a 'control' containing the controls representing the items. As may be appreciated, using controls allows a designer to design the layout and the items therein by selecting pre-defined stock controls from an available toolbox containing same and then by modifying each selected control as necessary to result in a final form. Typically, each control includes functionality both to aid the designer in designing with same and to aid the user in using same, of course along with base functionality that allows the control to operate in the manner required.

In at least some arrangements, each item within a layout is positioned according to one or more positioning systems. In one positioning system, the layout for a defined area is a table layout that includes a plurality of defined cells arranged in defined rows and columns, and each item to be set forth within the layout is specified according to defined attributes including row and column placement and extent. In another positioning system, each item within the layout is defined according to position with respect to aspects of the layout and/or other items in the layout, such as for example a defined distance from a right side of the layout, a defined percentage of the total height of the layout down from a top side thereof, a defined distance from an item to the left, or a varying distance from such item to the left, among other things.

In many computer-type applications, layouts are dynamic in that each layout can change based on several factors. For example, a layout may change based on a user re-sizing same, based on an item being added thereto or removed therefrom, based on content displayed in connection with an item changing, based on a size of an item changing, etc.

Significantly, each time a dynamic layout changes, each of one or more items therein may require relocation in order to accommodate changes to the layout and/or other items therein. For example, if a layout is resized to be smaller, one or more items therein may have to be relocated to accommodate the smaller space, perhaps by being moved closer to other items therein. Likewise, if a particular item in a layout is resized to be larger, perhaps to accommodate additional text, one or more other items in the layout may have to be relocated to accommodate the larger item, perhaps by being moved away from such larger item.

Thus, in prior art systems and methods that employ the aforementioned positioning system where each item within the layout is defined according to position with respect to aspects of the layout and/or other items in the layout, certain constructs have been defined with regard to each item in a layout in an effort to locate and relocate such item. However, at least some of such constructs have been found to be overly complicated and/or cumbersome to employ in connection with a layout, especially when attempting to relocate each item in the layout in a time-efficient manner. In particular, it has been found that constructs that specify location of an item in a layout in terms of another item within such layout can be quite complex, especially for a designer designing the layout with the items, and also for a computing device attempting to relocate the items within the layout.

Accordingly, a need exists for a construct that is better suited to relocating items within a layout. In particular, a need exists for such a construct that is not complex and therefore can be employed in real-time or near-real-time in response to changes to a dynamic layout. Finally, a need exists for a method of relocating each item within a layout when a location for such item is specified at least partially based on such a construct.

SUMMARY OF THE INVENTION

The aforementioned needs are satisfied at least in part by the present invention in which a system and method is provided to instantiating on a display of a computing device a layout including a plurality of items therein. The layout is dynamic in that at least one of the items and the layout are changeable and may require relocation and/or resizing. Each item has a periphery and at least one of the items is defined to include a margin exterior to the periphery thereof. The margin is a defined distance from the periphery of the item within which another item cannot reside. In response to another item being moved so as to encroach upon the margin of an item at issue, the item at issue is to be relocated away from and in the opposite direction from the another item to clear such encroaching item from such encroached-upon margin and thereby relieve such encroachment.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF THE INVENTION

Computer Environment

Figure 1:
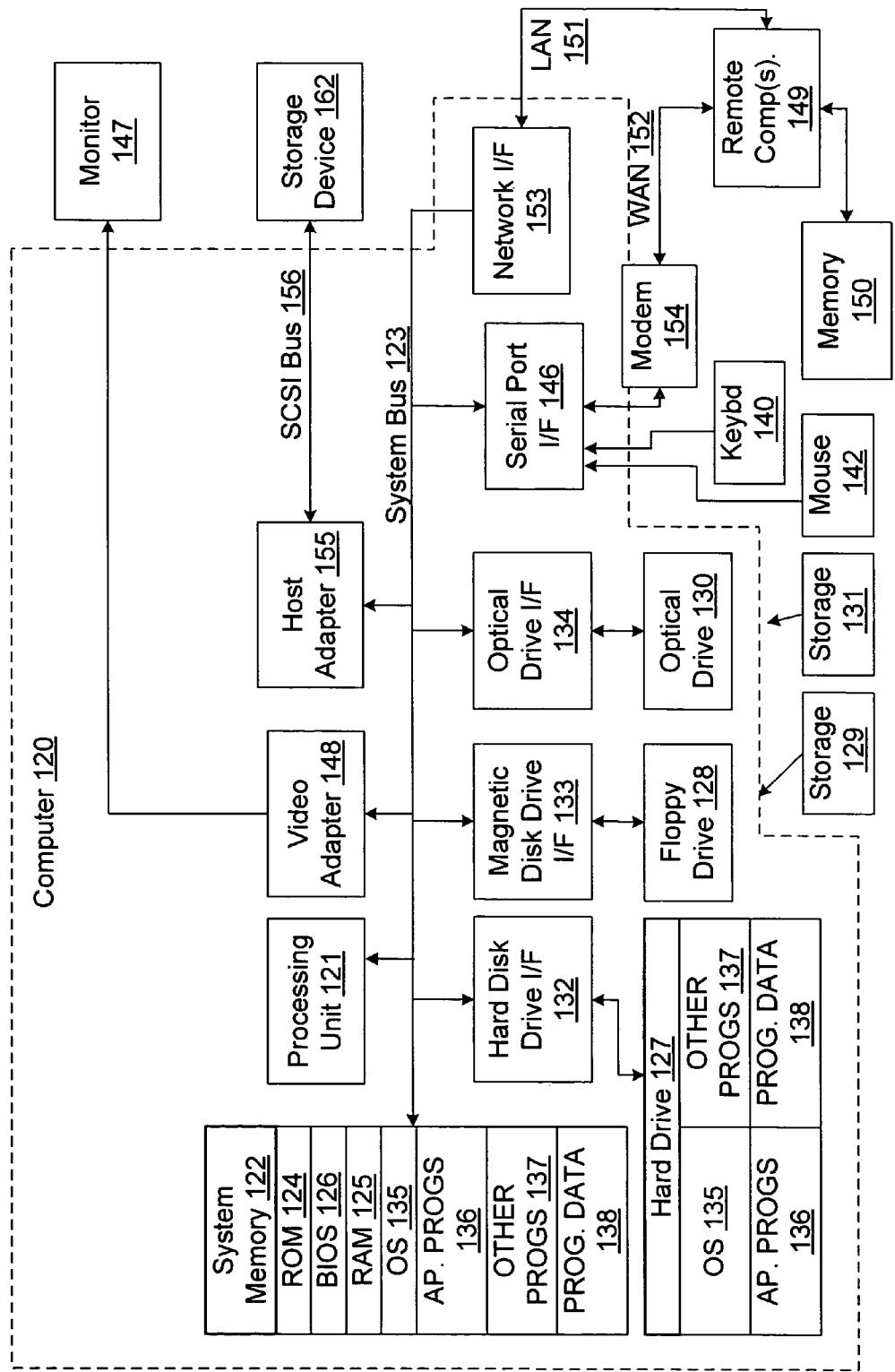
FIG. 1 is a block diagram representing a general purpose computer system in which aspects of the present invention and/or portions thereof may be incorporated.

FIG. 1 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 120.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application programs 136, other program modules 137 and program data 138. A user may enter commands and information into the personal computer 120 through input devices such as a keyboard 140 and pointing device 142. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 1 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets, and the Internet.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Automatically Relocating Items in a Layout

Figure 2:
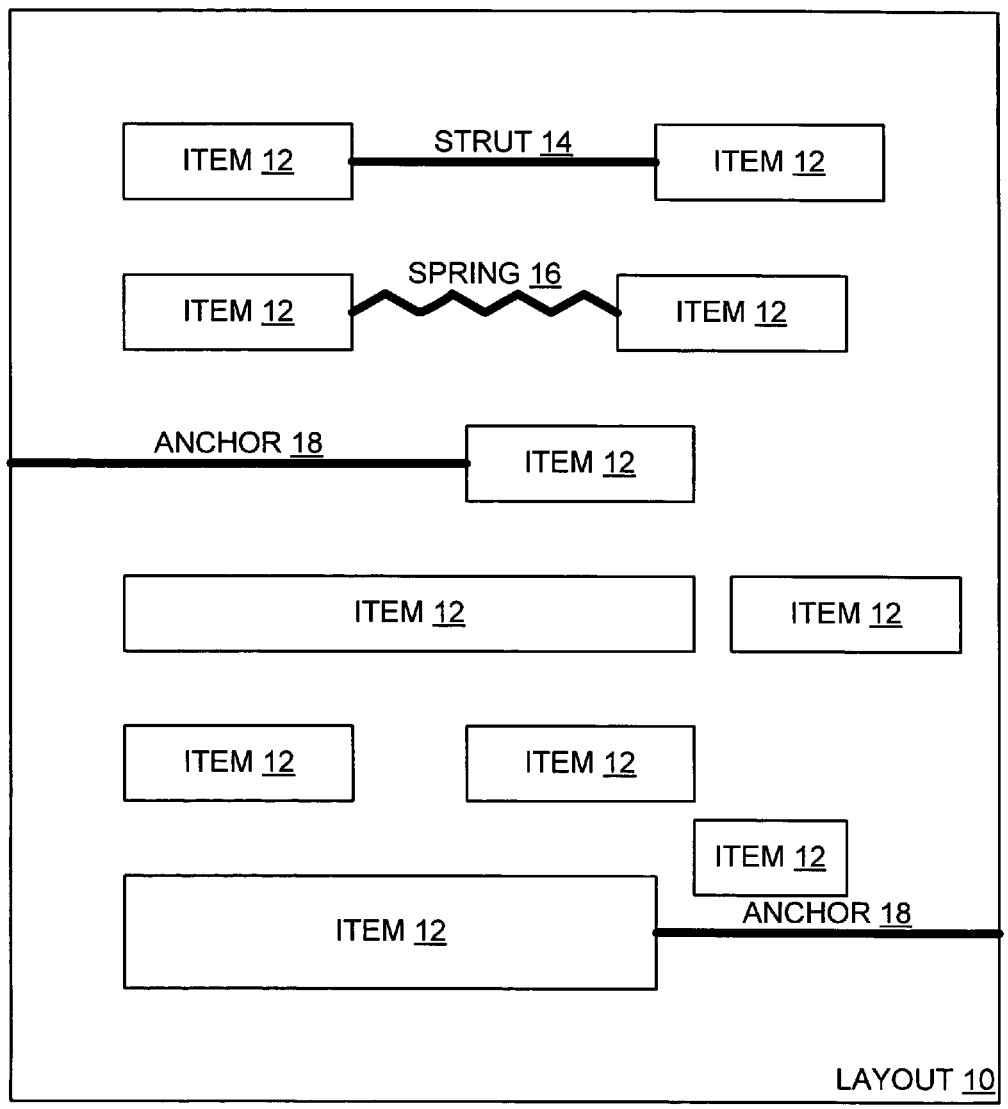
FIG. 2 is a block diagram showing a layout having a plurality of items therein, where each of various of the items are interconnected with another item or with the layout by various constructs such that relocating such item is done with reference to the interconnected item or layout according to the properties of the interconnecting construct.

Preliminarily, and as may be seen in FIG. 2, a layout 10 such as is employed in connection with the present invention includes a plurality of items 12 positioned therein. Each such item 12 may be positioned according to any of several criteria. For example, each of at least some items 12 may be initially positioned at a predefined distance from the top side of the layout and a predefined distance from the left side of the layout, where such distances are set forth in an amenable unit of measure, such as for example a pixel.

In addition or in the alternative, each of at least some items 12 in the layout 10 may be positioned according to a predefined distance such as 10 pixels from another item 12, such as for example another item 12 to the left or toward the bottom. In such a situation, it may be said that the item 12 is connected to the another item 12 in the layout by way of a 'strut' construct 14 specified for the item 12. Also in addition or in the alternative, each of at least some items 12 in the layout 10 may be positioned according to a flexible distance from another item 12, such as for example another item 12 to the right or toward the top. Such flexibility may for example be set by a current dimension of the layout 10 or of an item 12 therein. In such a situation, it may be said that the item 12 is connected to the another item 12 in the layout by way of a 'spring' construct 16 specified for the item 12. Further in addition or in the alternative, each of at least some items 12 may be specified as being positioned according to a fixed or flexible distance from one or more sides of the layout 10. In such a situation, it may be said that the item 12 is 'anchored' to such sides of the layout by way of one or more 'anchor' constructs 18 specified for the item 12.

Notably, though, using such strut, spring, and anchor constructs 14, 16, 18 and the like introduces significant complexity to a layout 10 and a relocation of corresponding items 12 therein in response to a re-sizing. In particular, and as should be appreciated, such constructs 14, 16, 18 and the like introduce additional demands that must be individually satisfied, where doing so may require significant amounts of computational time. In effect, such constructs 14, 16, 18, etc. each represent an equation that must be satisfied simultaneously, and as is known solving such simultaneous equations becomes exceedingly difficult, especially as the number of equations increase. Moreover, it can be the case that simultaneous equations cannot be solved, if for example too many variables are present or if the equations are contradictory. To summarize, then, defining each item 12 within a layout 10 according to position with respect to aspects of the layout 10 and/or other items 12 in the layout can be overly complicated and/or cumbersome, especially when attempting to relocate each item 12 in the layout 10 in a time-efficient manner.

Figure 3A:
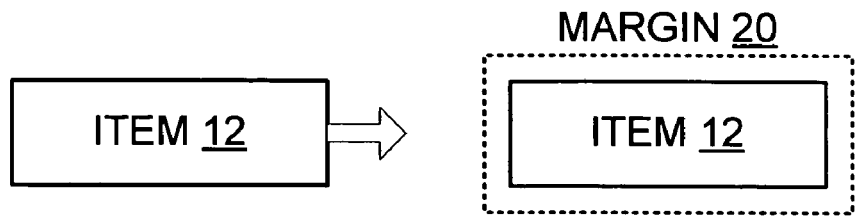
FIG. 3A-3C are block diagrams showing an item with a defined exterior margin construct and the reaction of such item from being 'bumped' by another relocating item in accordance with one embodiment of the present invention.

In one embodiment of the present invention, then, and turning now to FIG. 3A, each of at least some items 12 in a layout 10 is not specified with respect to any other item 12 in the layout 10 or with respect to the layout 10 itself, such as for example by way of a strut 14, spring 16, or anchor 18. Instead, each such item 12 is provided with an initial location and is also defined according to a 'margin' construct 20, whereby each side of the item is provided with a predefined exterior margin 20 that cannot be encroached upon by another item 12 in the layout 10, certain exceptions being applicable as set forth in more detail below.

Figure 3B:
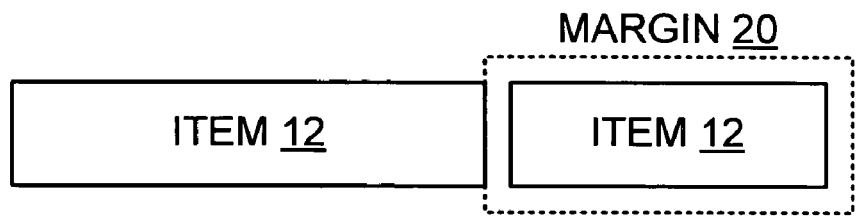
Figure 3C:
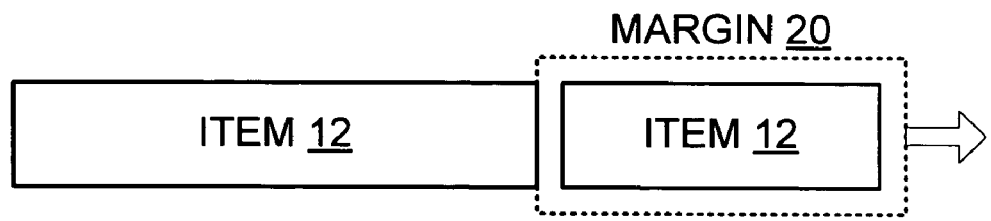

Thus, when another item 12 'bumps' into a margin 20 of an item 12 at issue, the item 12 at issue moves away from and in the opposite direction from the bumping item 12. In particular, as initially positioned and as shown in FIG. 3A, and in a situation where the layout 10 and/or an item 12 therein is re-sized, and where in the course of such re-sizing another item 12 in the layout 10 expands toward and in fact does encroach on a margin 20 (shown as a dashed line) of an item 12 at issue as shown in FIG. 3B, the item 12 at issue is moved far enough away from the encroaching item 12 in the opposite direction thereof to clear such encroaching item 12 from such encroached-upon margin 20 and thereby relieve such encroachment as shown in FIG. 3C.

Note that in certain circumstances it may be the case that a bumped item 12 cannot be relocated. For example, it may be that an item 12 in a layout 10 'bumps' into another item 12 in the layout 10 from the left, where such another item 12 has a fixed anchor 18 to the right side of the layout 10 that prevents the another item 12 from being moved away from the bumping item 12 and toward such right side of the layout 10. In such situation, and in one embodiment of the present, rather than relocating the anchored bumped item 12 within the layout 10 as it exists, an attempt is first made to enlarge the layout 10 toward the right, which by extension would relocate the anchored bumped item 12 to the right. If such attempt to enlarge the layout 10 fails, for example because the layout is at a maximum size or the right side cannot be moved further toward the right, then the margins 20 of the bumped item 12 can be ignored, and the bumped item 12 can even be overlaid with the bumping item 12.

Note, though, that it may instead be desired to ignore the distance set by the fixed anchor 18 of the bumped item 12. In such situation, then, and in one embodiment of the present invention, the bumped item 12 with the anchor 18 may be provided with an anchor distance override attribute that when set in fact allows ignoring of the distance set by the fixed anchor 18. In such situation, then, the margins 20 of the bumped item 12 are respected, even though the bumped item 12 has a fixed anchor 18, by moving the bumped item 12 in the direction opposite the bump.

Figure 4A:
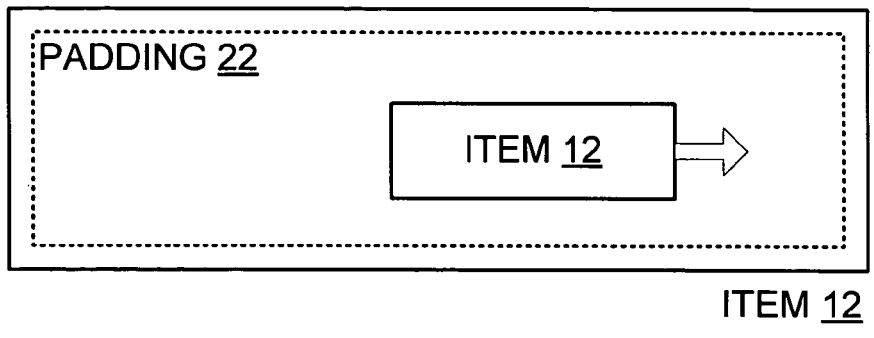
FIG. 4A-4C are block diagrams showing an item with a defined interior padding construct and the reaction of such item from being 'bumped' by another relocating item in accordance with one embodiment of the present invention.

In one embodiment of the present invention, and similar to a margin 20, an item 12 may be defined according to a 'padding' construct 22, as seen in FIG. 4A, whereby each side of the item is provided with a predefined interior padding 22 that cannot be encroached upon by another item 12 within such item 12, certain exceptions being applicable. Note that the aforementioned layout 10 may be an example of a nesting item 12 within which is positioned a nested item 12. Thus, in the situation where a nesting item 12 has a nested item 12 therein, movement of the nested item 12 into the padding of the nesting item 12 causes the nesting item 12 to move to honor the padding 22 thereof, either by re-sizing or more likely by re-positioning of the nesting item 12.

Figure 4B:
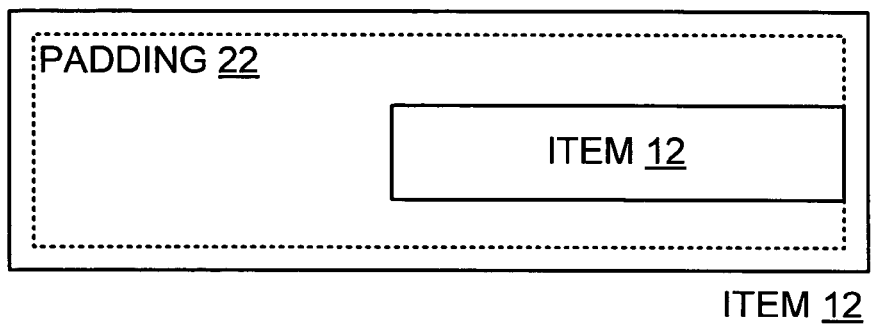
Figure 4C:
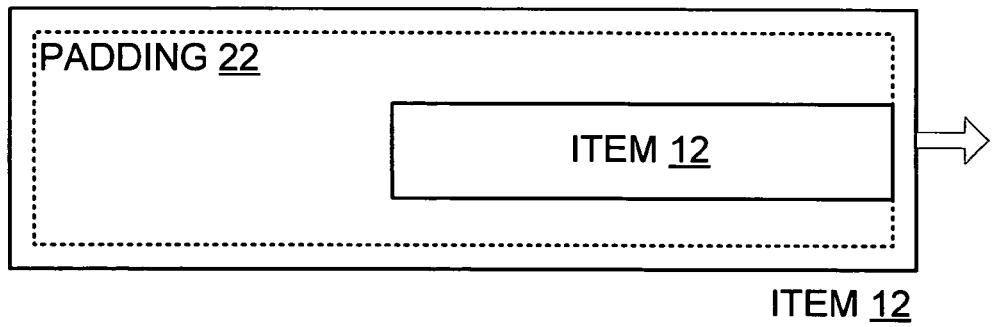

As before, such nesting item 12 moves away from and in the opposite direction from the bumping nested item 12. In particular, as initially positioned and as shown in FIG. 4A, and in a situation where a nested item 12 moves toward and in fact does encroach on a padding 22 (shown as a dashed line) of a nesting item 12 as shown in FIG. 4B, the nesting item 12 is moved far enough away from the encroaching nested item 12 in the opposite direction from the location of the bump to clear such encroaching nested item 12 from such encroached-upon padding 22 and thereby relieve such encroachment as shown in FIG. 4C.

Figure 5A:
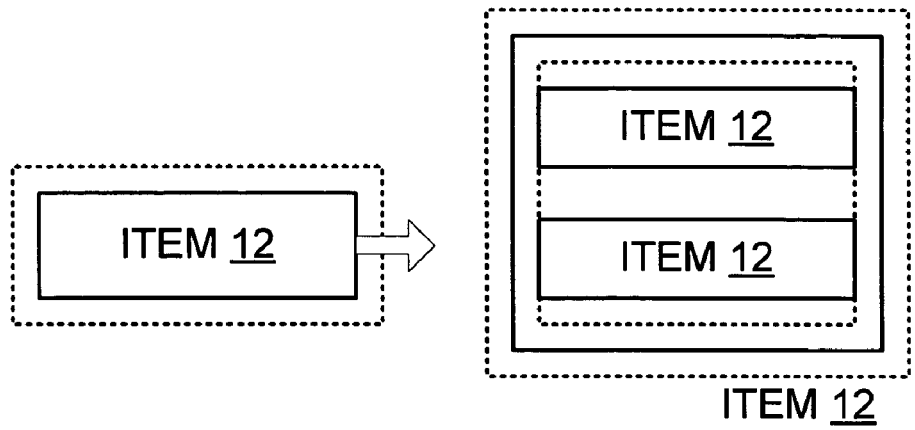
FIG. 5A-5C are block diagrams showing a nesting item with stacked and nested items therein, each item variously having defined padding and/or margin constructs, and the reaction of such nesting and nested items from the nesting item being 'bumped' by another relocating item in accordance with one embodiment of the present invention.
Figure 5B:
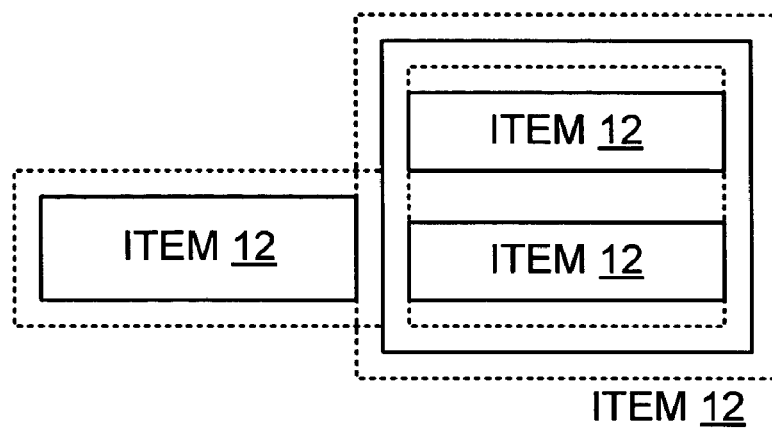
Figure 5C:
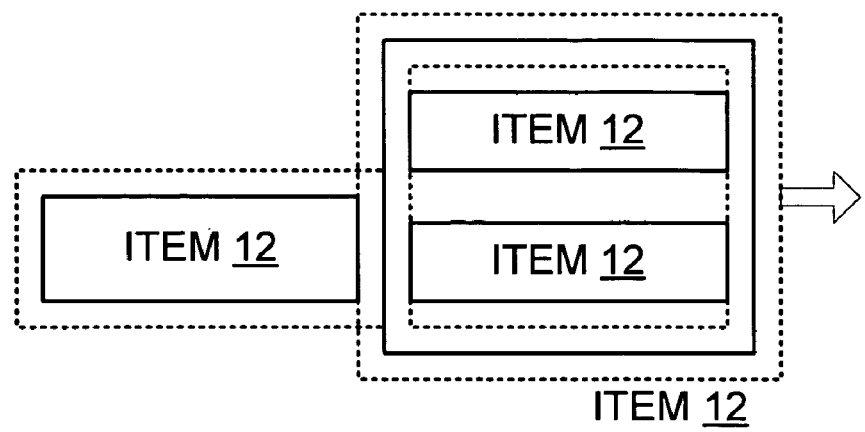

With margins 20 and padding 22, it is possible to keep a group of stacked items 12 in such stacked arrangement by enclosing such stacked items 12 within a nesting item 12, as is seen in FIGS. 5A-5C, where such nesting item 12 is provided with an appropriate margin 20 and padding 22 and each of the stacked nested items 12 therein is provided with an appropriate margin 20. Note that the nesting item 12 may be displayed or may be invisible as desired, and is shown as being displayed in FIGS. 5A-5C. In such situation, and as initially positioned and as shown in FIG. 5A, and in a situation where another item 12 moves toward and in fact does encroach on the margin 20 of the nesting item 12 as shown in FIG. 5B, the nesting item 12 and the stacked nested items 12 are moved together far enough away from the encroaching item 12 in the opposite direction from the location of the bump to clear such encroaching item 12 from such encroached-upon margin 20 and thereby relieve such encroachment as shown in FIG. 5C.

Note that in the course of moving a first item 12 in response to being bumped by a second item 12, the first item 12 may in turn bump into a third item 12, etc., in effect setting forth a chain reaction of bumping until all items 12 settle out into a non-bumped state. In such a situation, each bumped item 12 should be repositioned in turn until no bumping item 12 bumps into any other bumped item 12. However, it should be kept in mind that it is conceivable that an infinite loop of bumping items 12 can exists, whereby the chain reaction of bumping continues in perpetuity without any non-bumped state being achieved. Such a situation may be detected by noting whenever an item 12 has been bumped twice before a non-bumped state has been achieved. If in fact an item 12 has been bumped twice before a non-bumped state has been achieved, an infinite loop likely exists, and the chain reaction of bumping is ceased by simply accepting overlap and stopping any further repositioning.

Note, too, that in the course of moving the first item 12 in response to being bumped by the second item 12, the first item 12 may in turn move through and past the third item 12 into a final non-overlapping position with respect to such third item 12. While not overlapping, such movement through and past the third item 12 should still be considered a bump requiring movement of the third item 12. Otherwise, the third item 12 would remain on the opposite side of the first item 12 as compared with that which was intended. Put more simply, in the present invention, a bump occurs when one item 12 moves into contact with another item 12, regardless of whether the movement of the one item 12 causes same to clear the another item 12.

CONCLUSION

The present invention may be practiced with regard to repositioning of any appropriate items 12 and layouts 10 of such items 12. As should now be appreciated, with the present invention as set forth herein, items 12 within a layout 10 may be repositioned in response to a resizing in at least a near-optimal manner so that items 12 are presented within the layout 10 with efficient space utilization and in an aesthetic manner, and with a minimum of description regarding relative arrangements of particular items 12.

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the foregoing description, it can be seen that the present invention comprises new and useful constructs including a margin construct 20 and a padding construct 22 that are better suited to relocating items 12 within a layout 10. Such constructs 20, 22 are not complex and therefore can be employed in real-time or near-real-time in response to changes to a dynamic layout 10. Further, relocating each item 12 within a layout 10 is simplified when a location for such item 12 is specified at least partially based on such a construct 20, 22.

It should be appreciated that changes could be made to the embodiments described above without departing from the inventive concepts thereof. In general then, it should be understood, therefore, that this invention is not limited to the particular embodiments disclosed, but it is intended to cover modifications within the spirit and scope of the present invention as defined by the appended claims.

The invention claimed is:

1. A computer-readable storage medium having stored thereon computer-instructions for instantiating on a display of a computing device a layout including a plurality of items therein, the plurality of items including at least a first item and a second item not specified in location with respect to any other item of said layout, the layout being dynamic in that at least the first and second items and the layout are changeable and may require relocation and/or resizing, each item having a periphery and at least the first item being defined to include a margin exterior to the periphery thereof, the margin comprising a defined distance from the periphery of the first item within which another item cannot reside, wherein:

in response to the second item being moved so as to encroach upon the margin of the first item, the first item is relocated away from and in the opposite direction from the second item to clear such encroachment by the second item on the margin of the first item; and when relocating the first item causes a chain reaction of encroachments and relocations of other items in the layout and when any item of the plurality of items is encroached upon at least two times during such chain reaction before a non-encroachment state has been achieved, then one or more items of the plurality of items are permitted to overlap within the layout.

2. The medium of claim 1 wherein the periphery of an item comprises a plurality of sides and wherein each of at least some of the sides of the item is defined to have a margin specific to such side.

3. A computer-readable storage medium having stored thereon computer-instructions for instantiating on a display of a computing device a layout including a plurality of items therein, at least one of the items not specified in location with respect to any other item of said layout, the layout being dynamic in that at least one of the items and the layout are changeable and may require relocation and/or resizing, each item having a periphery and at least one of the items being a nesting item having a nested item disposed within the periphery thereof, the nesting item defined to include a padding interior to the periphery thereof, the padding comprising a defined distance from the periphery of the nesting item within which the nested item therein cannot reside, wherein:

in response to the nested item being moved so as to encroach upon the padding of the nesting item, the nesting item is relocated away from and in the opposite direction from the nested item to clear such encroachment by the nested item on the padding of the nesting item; and when relocating the nesting item causes a chain reaction of encroachments and relocations of other items in the layout and when an item of the plurality of items is encroached upon at least two times during such chain reaction before a non-encroachment state has been achieved, then one or more items of the plurality of items are permitted to overlap within the layout.

4. The medium of claim 3 wherein the periphery of an item comprises a plurality of sides and wherein each of at least some of the sides of the item is defined to have a padding specific to such side.

5. A method for automatically locating items in a user interface layout on a display of a computing device, the layout including a plurality of peripheral walls and first and second items therein, the second item not specified in location with respect to any other item of the layout, the first item having a plurality of peripheral walls and being defined to include a margin exterior to the periphery thereof, the margin comprising a defined distance from the peripheral walls of the item within which another item cannot reside, the first item also being defined to include an anchor comprising a defined distance between a particular peripheral wall of the first item and a particular peripheral wall of the layout, wherein in response to the second item being moved so as to encroach upon the margin of the first item, the method comprising acts of:

relocating the first item in an opposite direction away from the second item to clear such encroachment by the second item on the margin of the first item, presuming the anchor of the first item allows such relocating;

when the anchor of the first item does not allow such relocating, then enlarging the layout in the opposite direction from the second item to clear such encroachment by the second item on the margin of the first item, presuming such enlarging is permitted;

when enlarging the layout is not permitted or when permitted would not clear said encroachment, then selecting a member of a group consisting of:

ignoring the margin of the first item and allowing the encroachment; and ignoring the defined distance of the anchor of the first item if the first item so allows.

\* \* \* \* \*